(No Model.)  3 Sheets—Sheet 1.

G. MARTIN.
CORN CUTTING MACHINE.

No. 346,210. Patented July 27, 1886.

Attest:
J. E. West
W. L. McCormick

Inventor:
Gabriel Martin
Per C. D. Campbell (No Model.)
3 Sheets—Sheet 2.

G. MARTIN.
CORN CUTTING MACHINE.

No. 346,210.
Patented July 27, 1886.

Attest:
J. E. West
W. L. McCormick

Inventor:
Gabriel Martin
Per C. D. Campbell (No Model.) 3 Sheets—Sheet 3.

G. MARTIN,
CORN CUTTING MACHINE.

No. 346,210. Patented July 27, 1886.

Attest:
W. L. McCormick
J. O. West

Inventor:
Gabriel Martin
per C. D. Campbell

UNITED STATES PATENT OFFICE.

GABRIEL MARTIN, OF MONROE, LOGAN COUNTY, OHIO.

CORN-CUTTING MACHINE.

SPECIFICATION forming part of Letters Patent No. 346,210, dated July 27, 1886.

Application filed January 5, 1885. Serial No. 152,117. (No model.)

*To all whom it may concern:*

Be it known that I, GABRIEL MARTIN, a citizen of the United States, and a resident of Monroe township, in the county of Logan and State of Ohio, have invented a new and useful Corn-Cutting Machine, of which the following is a specification.

My invention relates to a corn-cutting machine for cutting standing corn; and it consists, essentially, as a means of guiding the corn to the knives and holding it in a bent position during cutting similar to that required in hand-cutting, thus giving an oblique cut across the stalk; in the cutting mechanism and the machinery for actuating the different parts; in a dumping table or platform for retaining and dumping the cut corn.

Figure 1:
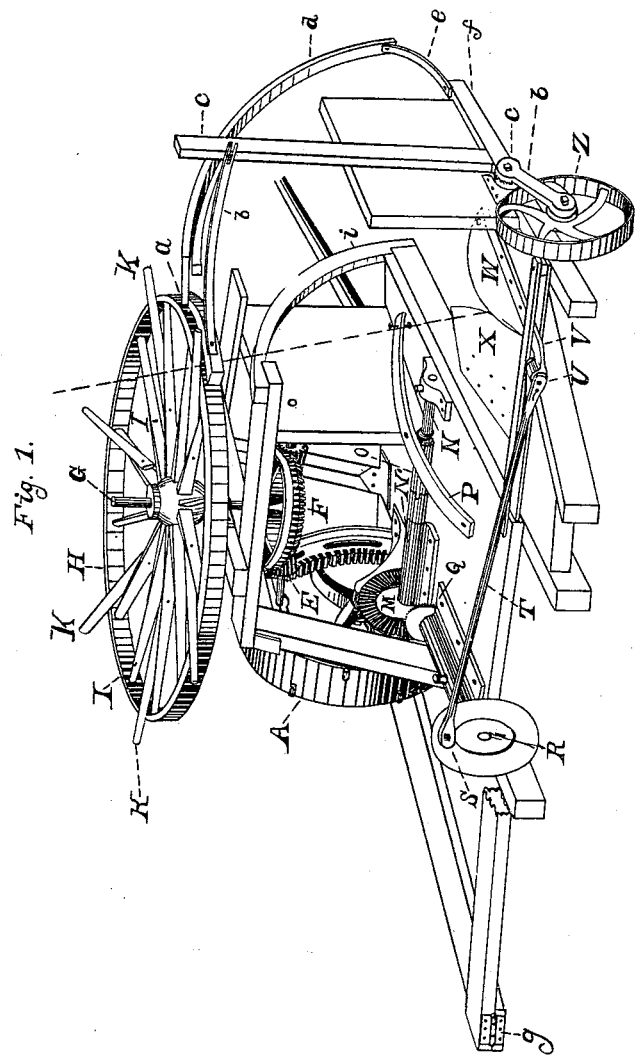
Figure 2:
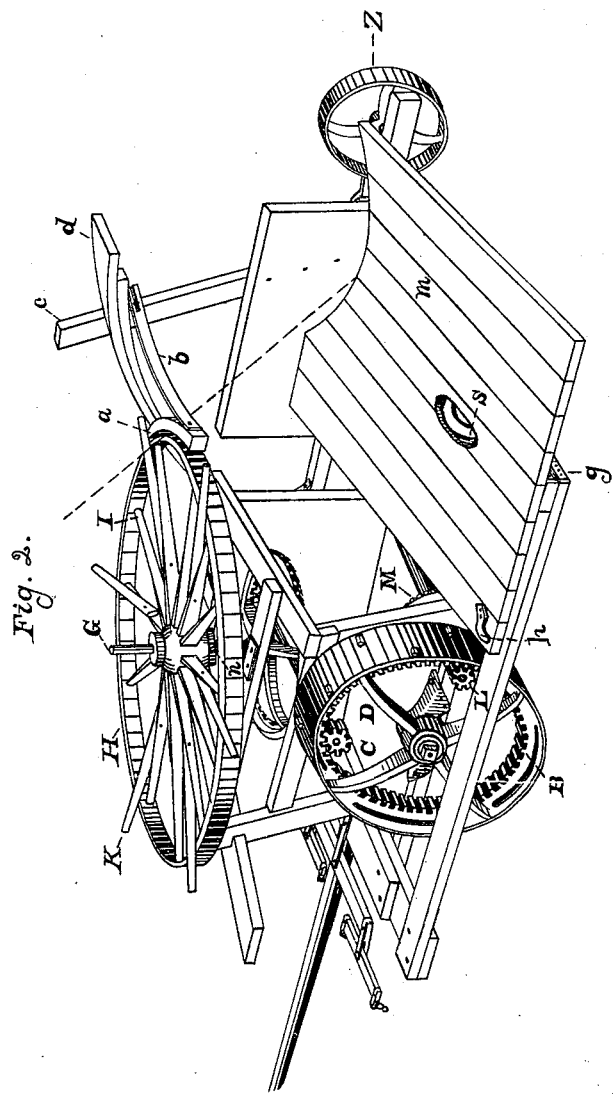
Figures 3, 4:
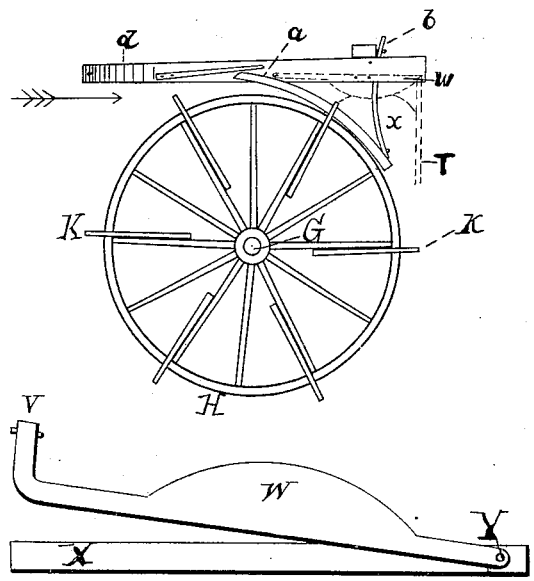

Figure 1 is a perspective rear view without the dumping-platform; Fig. 2, a perspective rear view with the dumping-table attached; Fig. 3, a top plan view of my gathering-in reel and spring-guide, also showing in dotted lines the relative positions of the knives. Fig. 4 is a top view of knife W, showing the manner of pivoting the same at its front end to the machine-frame.

The position the corn is held in while cutting is shown in dotted lines, Figs. 1 and 2.

The driver's seat, which is located near the main driving-wheel, is omitted to better show the machinery.

In the drawings, A is the main driving-wheel, having the internal gear, B.

C is a spur-pinion on shaft D, which, through pinion E, operates the gear F, upon the upper end of whose shaft G the reel is mounted.

I represents spokes of reel.

K represents arms projecting from the top of the reel to gather in and bend the stalks over as the machine advances. These arms feed the stalks through between the periphery of the wheel H, and the spring-guide *a* bending the stalk so that the knives will cut across the same in an oblique direction, as in hand-cutting.

L, Fig. 2, is a spur-pinion on the end of shaft N, that gears with the internal gear, B.

M is a bevel-gear on sleeve N', mounted loosely on shaft N.

O is a clutch attached to shaft N, for engaging and operating sleeve N', and through it the bevel-gear M.

P is a lever for operating clutch O.

Q is a bevel-pinion on shaft R, that engages with bevel-gear M, and operates the crank-wheel S, and through it pitman T.

U is a wrist-pin connecting pitman T with knife-bar W.

W is a shearing-knife, pivoted at its front end.

R is the shaft on which crank-disk S is mounted.

X is a stationary knife, over the edge of which the cornstalk is bent, and against which the blade W shears.

Z is the grain-wheel of the machine, which is mounted on arm *b*, pivoted at *c*, to lower or raise the rear of the machine to adjust the knives to corn of different heights.

*e* is a receiving and dumping platform, pivoted or hinged at points *f g*, and cut away at one end to allow the corn to bend, and having handle *h*, by means of which the driver dumps the same at points desired. The platform is shown broken away that wheel S may be seen. The end next the knives is somewhat higher than the other end.

*d i* are guards, which straddle the corn-row and guide the corn to the reel-arms K. The reel H I K is adjustable vertically on the spindle G for different heights of corn.

The operation of my machine is as follows: The machine is driven so that the guides *d* and *i* straddle the row and guide the stalk to the gathering-in and bending arms K, which carry them around between the periphery of wheel H, and spring-guide *a* bending the stalk in proper position for cutting. The guide-arm *a* yields readily to allow a large stalk to pass through, but holds the small ones tight enough against the wheel. When the stalk is bent the farthest around the periphery of the wheel and then inclined the farthest from a perpendicular, the knives shear it off, which then drops upon the receiving or dumping platform *m*, where it is carried until the desired number of stalks are cut, when the whole is dumped. I prefer to dump at each twentieth hill, leaving the corn in rows of bunches clear across the field in one direction.

What I claim is—

In a corn-harvesting machine, the combination of the driving-wheel, internal gear, B, shaft N, pinion L, bevel-gear M, bevel-pinion Q, crank-shaft R, crank-wheel S, pitman T, shearing-cutters W X, the cutter W, pivoted at its front end, curved guide a, wheel H, having the arms K, and means for operating the reel and the dumping-table, as and for the purpose set forth.

GABRIEL MARTIN.

Witnesses:
E. M. CAMPBELL,
E. K. CAMPBELL.